United States Patent
Shaw et al.

(10) Patent No.: US 12,078,040 B2
(45) Date of Patent: Sep. 3, 2024

(54) DUAL DIRECTION LIFT GAS VALVE WITH CAVITATION PREVENTION

(71) Applicant: Silverwell Technology Ltd., Histon (GB)

(72) Inventors: Joel David Shaw, Houston, TX (US); Reece Eagles, Houston, TX (US); Greg Marshall, Houston, TX (US); Gerard Patterson, Houston, TX (US)

(73) Assignee: SILVERWELL TECHNOLOGY LTD., Cambridgeshire (GB)

( * ) Notice: Subject to any disclaimer, the term of this patent is extended or adjusted under 35 U.S.C. 154(b) by 0 days.

(21) Appl. No.: 18/355,051

(22) Filed: Jul. 19, 2023

(65) Prior Publication Data
US 2024/0026761 A1    Jan. 25, 2024

Related U.S. Application Data

(60) Provisional application No. 63/390,853, filed on Jul. 20, 2022.

(51) Int. Cl.
*E21B 43/12* (2006.01)
*F16K 1/38* (2006.01)
*F16K 3/24* (2006.01)

(52) U.S. Cl.
CPC ........... *E21B 43/123* (2013.01); *F16K 1/385* (2013.01); *F16K 3/246* (2013.01); *E21B 2200/02* (2020.05); *Y10T 137/2934* (2015.04)

(58) Field of Classification Search
CPC .. E21B 43/123; E21B 43/122; E21B 2200/02; E21B 34/10; F16K 1/385;
(Continued)

(56) References Cited

U.S. PATENT DOCUMENTS 1,884,548 A * 10/1932 Boynton ............... E21B 43/123
                                                                137/155
2,952,268 A    9/1960 Blum
(Continued)

FOREIGN PATENT DOCUMENTS

RU          2623750 C1      6/2017

OTHER PUBLICATIONS

International Search Report and Written Opinion for PCT Application No. PCT/GB2023/051917 dated Dec. 21, 2023.
(Continued)

*Primary Examiner* — Kelsey E Cary

(74) *Attorney, Agent, or Firm* — BRACEWELL LLP; Constance G. Rhebergen; Keith R. Derrington

(57) ABSTRACT

A bi-directional valve with valve elements having compliant features biasing them together to maintain a sealing interface that defines a fluid communication barrier within the valve. Parting the valve elements from one another removes the sealing interface allow fluid communication across the valve elements. The valve includes a side port and a choke member that selectively blocks fluid flow through the valve when moved adjacent the side port and selectively opens the valve to fluid communication when moved away from the side port. The choke member remains adjacent the side port until the valve elements are spaced a distance apart greater than that at which valve erosion or fluid cavitation occurs.

1 Claim, 5 Drawing Sheets

(58) Field of Classification Search
CPC . F16K 1/126; F16K 1/32; F16K 3/246; Y10T 137/2934
See application file for complete search history.

(56) References Cited

U.S. PATENT DOCUMENTS

| | | |
|---|---|---|
| 3,016,844 A | 1/1962 | Mncent |
| 3,086,593 A | 4/1963 | Chitwood |
| 3,722,527 A | 3/1973 | Blackwell |
| 3,754,597 A | 8/1973 | Garrett |
| 4,901,798 A | 2/1990 | Amani |
| 6,705,404 B2 | 3/2004 | Bosley |
| 6,715,550 B2 | 4/2004 | Vinegar et al. |
| 6,758,277 B2 | 7/2004 | Mnegar et al. |
| 7,896,082 B2 | 3/2011 | Lake et al. |
| 8,985,227 B2 | 3/2015 | Nikiforuk |
| 9,187,994 B2 | 11/2015 | Themig |
| 9,284,816 B2 | 3/2016 | Radford |
| 9,416,621 B2 | 8/2016 | MacKenzie et al. |
| 10,294,763 B2 | 5/2019 | Kleppa |
| 11,187,059 B2 | 11/2021 | Churchill |
| 2017/0016290 A1 | 1/2017 | Manwill et al. |
| 2018/0179855 A1 | 6/2018 | Messa et al. |
| 2020/0318741 A1 | 10/2020 | Zhang et al. |
| 2021/0108736 A1* | 4/2021 | Park .................. E21B 34/10 |
| 2022/0056784 A1 | 2/2022 | Culbertson et al. |

OTHER PUBLICATIONS

International Search Report and Written Opinion for PCT Application No. PCT/GB2023/052137 dated Nov. 9, 2023.
Partial International Search Report for PCT Application No. PCT/GB2023/051917 dated Oct. 31, 2023.

* cited by examiner

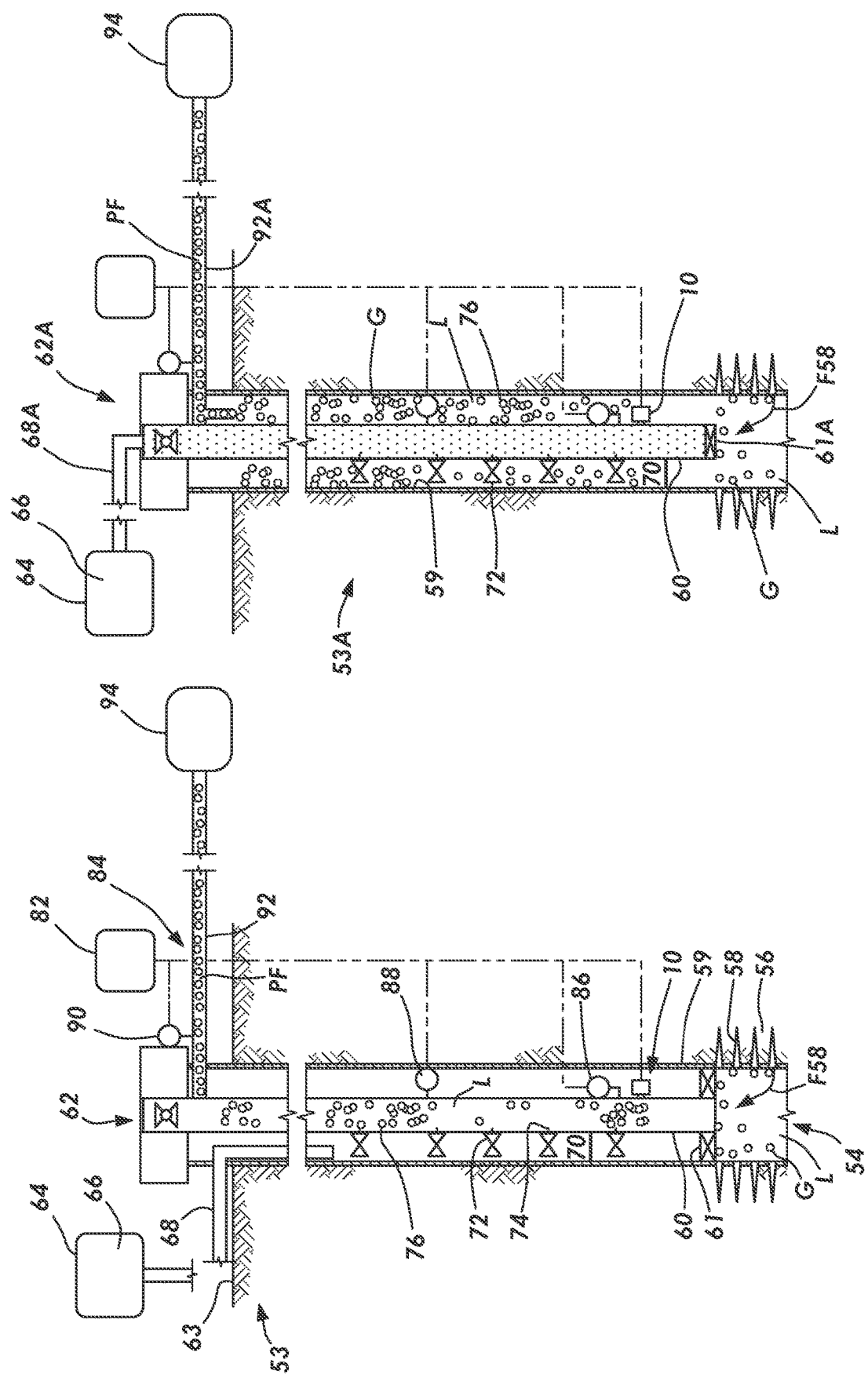

DUAL DIRECTION LIFT GAS VALVE WITH CAVITATION PREVENTION

CROSS-REFERENCE TO RELATED APPLICATION

This application claims priority to and the benefit of U.S. Provisional Application Ser. No. 63/390,853, filed Jul. 20, 2022, the full disclosure of which is incorporated by reference herein in its entirety and for all purposes.

BACKGROUND OF THE INVENTION

1. Field of Invention

The present disclosure relates to a bi-directional valve with redundant compliant sealing and that avoids erosion or cavitation on seal surfaces.

2. Description of Prior Art

Lift systems for unloading liquids from a well include pumps, such as electrical submersible pumps ("ESP"), which pressurize the liquid downhole and propel it up production tubing that carries the pressurized fluid to surface. Sucker rods and plunger lift pumps are also sometimes employed for lifting liquid from a well. In wells having an appreciable amount of gas mixed with the liquid a two-phase fluid may form and gas is sometimes separated from the fluid upstream of the ESP and routed to surface separately from the pressurized liquid. In some instances, compressor pumps are employed to pressurize the two-phase fluid to lift it to surface. A gas lift system is another type of artificial lift system, and that injects a lift gas, typically from surface, into production tubing installed in the well. The lift gas is usually directed into an annulus between the production tubing and sidewalls of the well, and from the annulus into the production tubing. Gas lift is commonly employed when pressure in a formation surrounding the well is insufficient to urge fluids to surface that are inside of the production tubing. By injecting sufficient lift gas into the production tubing, static head pressure of fluid inside the production tubing is reduced to below the pressure in the formation, so that the formation pressure is sufficient to push the fluids inside the production tubing to surface. Fluids that are usually in the production tubing are hydrocarbon liquids and gases produced from the surrounding formation. Sometimes these fluids are a result of forming the well or a workover and have been directed into the production tubing from the annulus.

The lift gas is typically transported to the well through a piping circuit on surface that connects a source of the lift gas to a wellhead assembly mounted over the well. Usually, valves are mounted on the production tubing for regulating the flow of lift gas into the production tubing from the annulus. Some types of these valves automatically open and close in response to designated pressures in the annulus and/or tubing, while other valve types are motor operated and controlled by signals delivered from a remote location. Shortcomings of many current valve designs include valve leakage from thermal effects and damage due to erosion, chatter, miscalibration to well conditions, or cavitation when throttling high pressure fluids.

SUMMARY OF THE INVENTION

Disclosed is an example of a valve for controlling fluid flow, and which includes a body having a sidewall, a chamber in the body, valve elements disposed in the chamber that are selectively moveable with respect to one another, sealing surfaces on the valve elements, a barrier to fluid communication between adjacent valve elements that is selectively formed by bringing sealing surfaces on the adjacent valve elements into sealing contact, a resilient member in biasing contact with an end of one of the adjacent valve elements distal from the barrier, so that sealing contact between the sealing surfaces is compliant, and side ports formed through the sidewall of the body that are in selective communication with one another. In an example, the valve elements are made up of first and second valve elements, the first valve element being an annular sleeve with an axial passage and the second valve element being a valve plug that is selectively inserted into the axial passage when the valve elements are in sealing contact. The biasing elements optionally include first and second biasing elements, the first biasing element in biasing contact with an end of the sleeve opposite the plug and having an outer surface in sliding contact with an inner surface of the chamber and the second biasing element in biasing contact with an end of the plug opposite the sleeve. The second biasing element is alternatively disposed in an actuator stem, and wherein the plug reciprocates with respect to the actuator stem. In an example, the side ports include a first side port formed through the sidewall and positioned forward of the sleeve, and a second side port formed through the sidewall and positioned rearward of the plug, where a flow path extends between the first and second side ports through the chamber, and where the flow path is bi-directional. In an embodiment, the valve further includes a choke member selectively moveable between an interfering position and a fluid flow position, the interfering position being between the chamber and one of the side ports to define a substantial barrier to fluid flow through the side port, the fluid flow position being spaced away from a periphery of the side port so that at least a portion of the side port is exposed to the chamber, where when the choke member is moved into the fluid flow position when sealing surfaces are positioned a threshold distance from one another so that a velocity of fluid flowing between the sealing surfaces is below a minimum velocity that causes erosion of the valve elements. In this example, the choke member is coupled to a one of the valve elements and at a distance from the sealing surface on the one of the valve elements that is strategically dimensioned so that the choke member is moved into the fluid flow position after the valve elements become spaced apart from one another a distance greater than the threshold distance. In an example, the side ports include a first side port that is in communication with an annulus in a wellbore, and a second side port that is in communication with production tubing disposed in the wellbore.

Another example of a valve for controlling a flow of fluid is disclosed and that includes a body having a sidewall, a chamber in the body, valve elements disposed in the chamber that are selectively moveable with respect to one another, sealing surfaces on the valve elements, a barrier to fluid communication between adjacent valve elements that is selectively formed by bringing sealing surfaces on the adjacent valve elements into sealing contact, side ports formed through a sidewall of the body that are in selective communication with one another, and a choke member selectively moveable from an interfering position, in which flow through a one of the ports is substantially restricted, and a fluid flow position, in which flow through the one of the ports is substantially unrestricted, when the sealing surfaces are positioned a threshold distance from one another so that a velocity of fluid flowing between the sealing surfaces is below a minimum velocity that causes erosion of the valve elements. Optionally, the adjacent valve elements are first and second valve elements, where the choke member is coupled with the first valve element, and where moving the first valve element a distance away from the second valve element moves the choke member in the same direction and distance. In an alternative, a one of the adjacent valve elements is a plug member, and where the choke member is an enlarged diameter portion of an actuator stem that attaches between the plug member and an actuator. In an embodiment, the sealing contact between the sealing surfaces on adjacent valve elements is compliant so that the barrier to fluid communication between adjacent valve elements is not disrupted by movement of one of the adjacent valve elements. In an example, the side ports is a first side port that is in communication with an annulus in a wellbore, and a second side port that is in communication with production tubing disposed in the wellbore.

Another example of a valve for controlling a flow of fluid is disclosed and that includes a body having a sidewall, a chamber in the body, valve elements disposed in the chamber that are selectively moveable with respect to one another, sealing surfaces on the valve elements, a barrier to fluid communication between adjacent valve elements that is selectively formed by bringing sealing surfaces on the adjacent valve elements into sealing contact, a means for compliantly maintaining the sealing surfaces in sealing contact, and side ports formed through the sidewall of the body that are in selective communication with one another. In an example, the adjacent valve elements is a plug having a frusto-conical outer surface, and an annular seat member having an axial bore profiled complementary to the plug, and where the sealing surfaces are formed on the plug outer surface and in the axial bore of the seat member. The means for compliantly maintaining the sealing surfaces in sealing contact is optionally a resilient member in biasing contact with an end of the plug distal from the seat member. In an alternative, the valve further includes an actuator stem having an end with a recess formed axially within and an opposite end coupled to an actuator for actuating the plug, and wherein the resilient member is a spring disposed in the recess and that biases the plug against the seat member. In one embodiment, the means for compliantly maintaining the sealing surfaces in sealing contact is a resilient member in biasing contact with an end of the seat member distal from the plug. In an example, the valve further includes a means for delaying flow through the valve until the adjacent valve elements are a distance apart from one another so that fluid flowing between the adjacent valve elements does not cause cavitation to either of the adjacent valve elements.

BRIEF DESCRIPTION OF DRAWINGS

Some of the features and benefits of the present invention having been stated, others will become apparent as the description proceeds when taken in conjunction with the accompanying drawings, in which:

FIG. 4 is a side section view of an example of lift gas flowing from an annulus, through the valve of FIG. 1, and into production tubing.

FIG. 5 is a side section view of an example of lift gas flowing from production tubing, through the valve of FIG. 1 and into an annulus.

Figure 1:
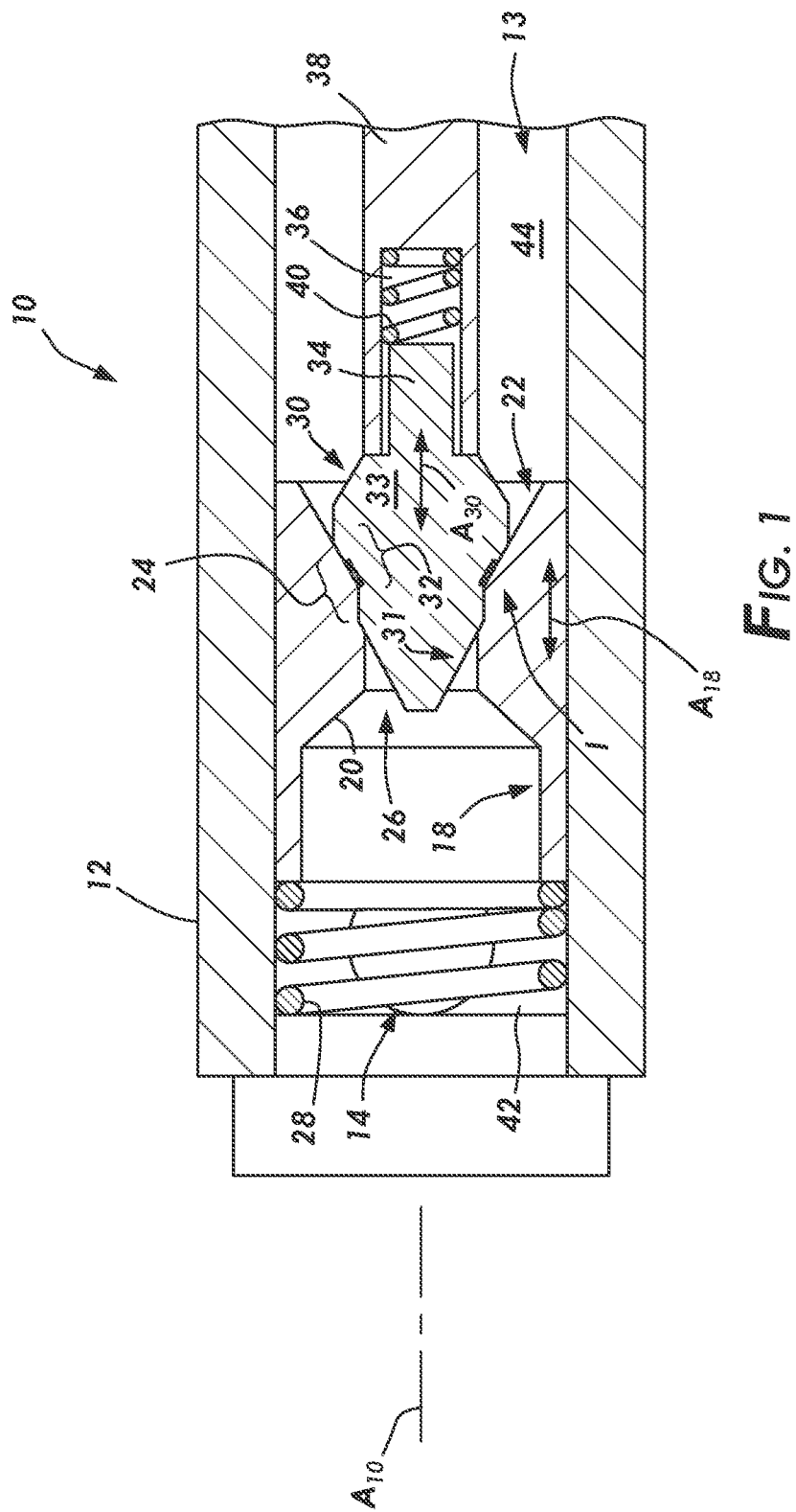
FIG. 1 is a side sectional view of an example of a valve in a closed configuration and with opposing sealing surfaces in contact.

While subject matter is described in connection with embodiments disclosed herein, it will be understood that the scope of the present disclosure is not limited to any particular embodiment. On the contrary, it is intended to cover all alternatives, modifications, and equivalents thereof.

DETAILED DESCRIPTION OF INVENTION

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of a cited magnitude. In an embodiment, the term "substantially" includes +/−5% of a cited magnitude, comparison, or description. In an embodiment, usage of the term "generally" includes +/−10% of a cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Shown in FIG. 1 is a side sectional view of an example of a valve assembly 10 having an annular valve housing 12, within the housing 12 is a chamber 13 that extends along an axis $A_{10}$ of the valve assembly 10. A side port 14 is formed radially through a sidewall of housing 12 and which provides communication between a portion of chamber 13 and to ambient of the housing 12. Spaced axially from side port 14 is another side port 16 (FIG. 2) formed radially through the sidewall of housing 12, side port 16 selectively provides communication between chamber 13 and ambient of the valve 10. An edge of side port 16 proximate side port 14 is referred to as a forward portion 17. An annular seat member 18 is shown coaxially within the chamber 13 with a lengthwise portion proximate port 14 having a radial thickness that remains substantially constant along its length. A distance axially away from port 14 the radial thickness of the seat member 18 increases to define a forward face 20 having a generally frusto-conical configuration. Axially past the forward face 20, the radial thickness of seat member 18 reduces along its axial length to form a rearward face 22 shown having a frusto-conical configuration. A seal face 24 is defined along a lengthwise portion of the rearward face 22, and also has a frusto-conical profile. In alternatives, seal face 24 has other profiles, such as a generally spherical profile or other standard configurations. A passage 26 extends axially through the seat member 18, an outer diameter of passage 26 is defined by the inner diameter of seat member 18.

In the example shown, a spring 28 is disposed within the chamber 13 and has a rearward end abutting a forward terminal end of seat member 18 that faces towards the port 14. Spring 18 applies a biasing force against member 18 in a rearward direction axially away from side port 14. Also included with valve assembly 10 is a plug 30 having a conically shaped outer surface, the outer diameter of which increases with distance from the port 14. A forward portion 31 of plug 30 is shown inserted within passage 26. A seal face 32 is formed on an outer surface of forward portion 31 that is shaped complimentary to seal face 24; in the example of FIG. 1, seal faces 24, 32 are in sealing contact with one another to form a sealing interface I that is a barrier to fluid communication between the member 18 and plug 30. On a rearward end 33 of plug 30 is a cylindrically shaped spindle 34 shown projecting axially away from forward portion 31 and extending into a recess 36, which is formed axially within a forward end of an elongated actuator stem 38 disposed within chamber 13. A spring 40 is provided in recess 36 that exerts a biasing force urging the plug 30 in a forward direction and against seat member 18. In the embodiment of FIG. 1, and as described in more detail below, spring 40 is strategically formed or selected to have a designated spring constant.

Valve assembly 10 illustrated in FIG. 1 is in a closed configuration, which in an example is defined by opposing seal faces 24, 32 being in sealing contact and that forms interface I along the faces 24, 32 that circumscribes the respective inner and outer surfaces of passage 26 and plug 30. In a non-limiting example of operation, the valve assembly 10 is put into the closed configuration by exerting an axial force onto one or both of seat member 18 and plug 30 to bring seal faces 24, 32 into sealing contact and form interface I; the axial force is optionally provided by moving actuator stem 38 towards seat member 18. In an alternative one or both springs 28, 40 become at least partially compressed by putting valve assembly 10 in the closed configuration. Seat member 18 and plug 30 are maintained in sealing contact with one another by the combination of spring 28 which biases the seat member 18 in the direction of plug 30, and spring 40 which biases plug 30 in the direction of seat member 18. As illustrated by arrow $A_{18}$ and arrow $A_{30}$, seat member 18 and plug 30 are each selectively movable along axis $A_{10}$. Adjacent portions of chamber 13 on opposing sides of interface I define compartments 42, 44. In addition to blocking fluid communication across interface I when faces 24, 32 are in sealing contact, examples exist in which interface I forms a pressure barrier to pressure isolate compartments 42, 44 from one another.

For the purposes of discussion herein, the term compliant or compliancy, regarding seal elements in a valve, describes a seal element or elements that in response to displacement (such as from a thermal effect) of itself or a corresponding seal element, repositions or can be repositioned to maintain sealing contact with the corresponding seal element. In a non-limiting example, the seat member 18 and plug 30 are referred to as valve elements and that provide a dual compliant functionality, the springs 28, 40 illustrate examples of dual biasing means. An advantage of the valve assembly 10 having the dual compliant valve elements with the dual biasing means is that sealing contact between plug 30 and seat member 18 is maintained continuously when the valve assembly 10 is put into the closed configuration and is not compromised by thermal effects of material expansion or contraction that might could cause leakage or sealing surface separation in a valve with non-compliant elements.

Figure 2:
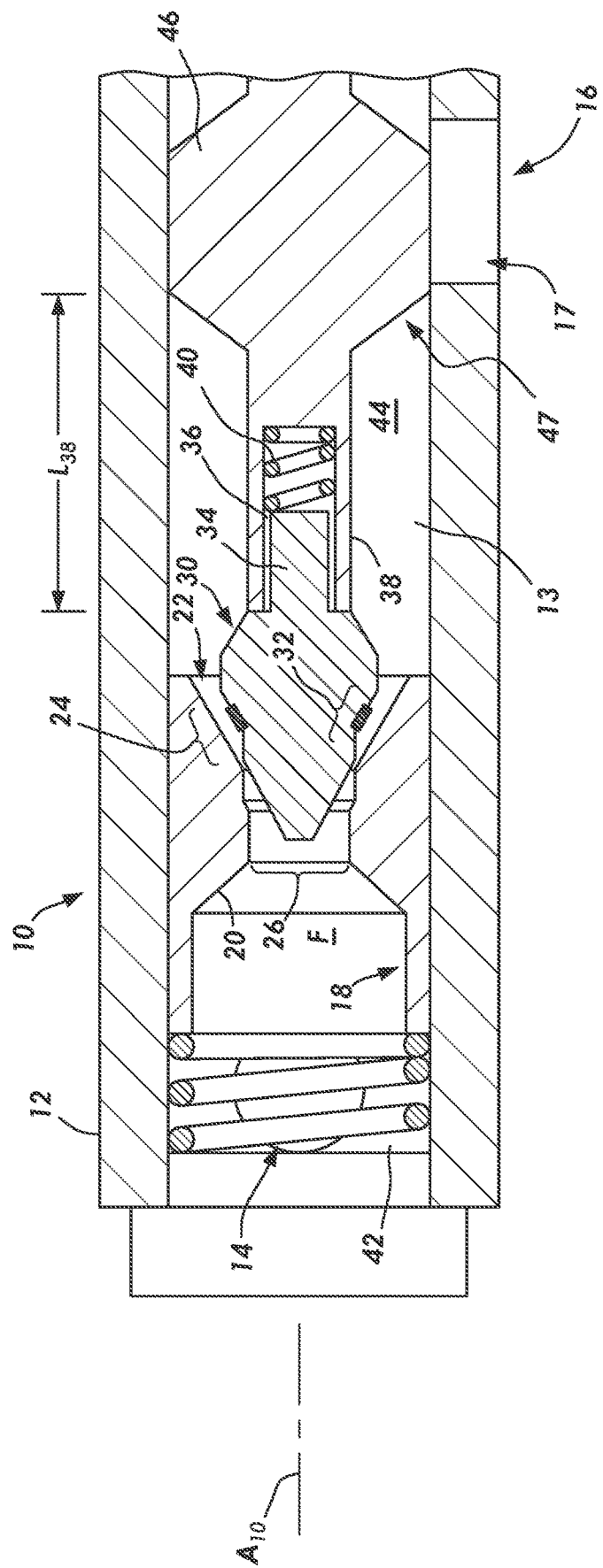
FIG. 2 is a side sectional view of the valve of FIG. 1 in the closed configuration and with the opposing sealing surfaces spaced away from one another.

Referring now to FIG. 2, plug 30 is moved axially away from seat member 18 to space apart the seal faces 24, 32, which removes the interface I (FIG. 1) and allows fluid communication between compartments 42, 44. Further shown in FIG. 2 is a choke member 46 integrally formed onto actuator stem 38 a distance $L_{38}$ from plug 30. For the purposes of reference, an end of choke member 46 proximate plug 30 is referred to as a forward end 47. In the illustrated example an outer diameter of choke member 46 is substantially equal to an inner diameter of chamber 13, which forms an interface along where an outer surface of choke member 46 and an inner surface of the side wall of housing 12 are in contact with one another. This contact interface between choke member 46 and inner sidewall of housing 12 defines a fluid flow barrier between chamber 13 and side port 16. In this example, the fluid flow barrier between side port 16 by choke member 46 substantial blocks fluid flow through the valve assembly 10 and between ports 14, 16. In the example shown, by selectively spacing choke member 46 a distance $L_{38}$ from plug 30, fluid F in valve assembly 10 remains substantially static inside chamber 13 as plug 30 is being separated from and moved away from seat member 18.

Figure 3:
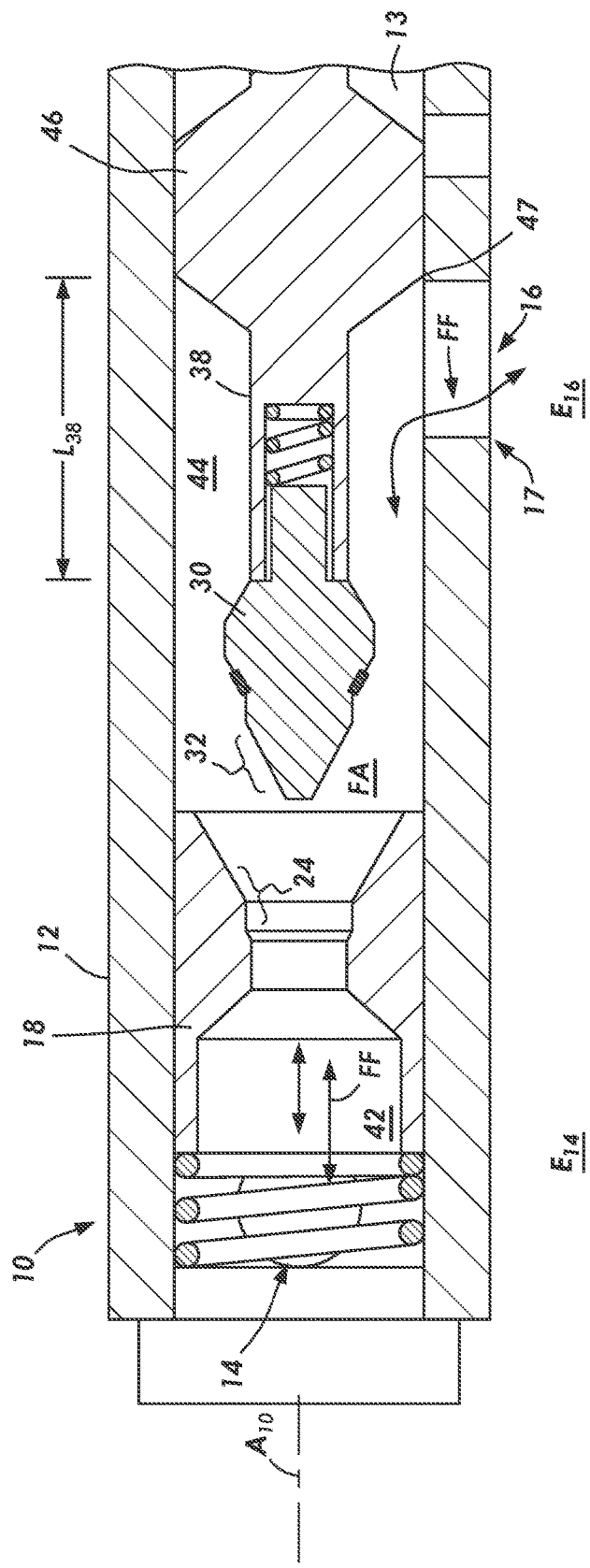
FIG. 3 is a side sectional view of the valve of FIG. 2 in an open configuration and with the opposing sealing surfaces spaced farther away from one another.

Referring now to FIG. 3, plug 30, stem 38, and choke member 46 are shown in a subsequent step of operation in which all have moved laterally farther away from seat member 18. In the example shown, a portion of choke member 46 is positioned forward of side port 16, so that no obstacles to fluid flow are between side port 16 and chamber 13. In the example of FIG. 3, environments $E_{14}$, $E_{16}$ are ambient to side ports 14, 16; in alternatives environments $E_{14}$, $E_{16}$ are separate and distinct from one another and/or are at different pressures. In an example sequence of operation occurring between FIG. 2 and FIG. 3, forward end 47 of choke member 46 moves rearward of forward portion 17 of port 16 to partially expose port 16 to chamber 13 to provide fluid communication between ports 14, 16 through chamber 13. Providing fluid communication between ports 14, 16 initiates the stream of flowing fluid FF through ports 14, 16, the volumetric flow of the fluid flow stream increases as the choke member 46 is moved farther rearward to expose a greater area of the port 16 to the chamber 13 to increase a cross sectional area of the fluid flow path through the valve assembly 10. In examples when pressure in environment $E_{14}$ exceeds that of environment $E_{16}$, so that a fluid FF in environment $E_{14}$ enters chamber 13 through side port 14, flows as a stream of flowing fluid FF through chamber 13, and exits chamber 13 through side port 16. In examples when pressure in environment $E_{16}$ exceeds that of environment $E_{14}$, so that a fluid FF in environment $E_{16}$ enters chamber 13 through side port 16, flows as a stream of flowing fluid FF through chamber 13, and exits chamber 13 through side port 14. In an example, the magnitude of distance $L_{38}$ is strategically set so that seal faces 24, 32 are at least a threshold distance apart to create a flow area FA between seal faces 24, 32 of adequate dimensions so that a velocity of flowing fluid FF passing through the flow area FA is below a magnitude at which erosion or cavitation of either seal face 24, 32 occurs or could occur. An additional advantage of the present disclosure is that a barrier to fluid flow through the valve assembly 10 is set a distance away from the sealing interface I and seal faces 24, 32 and that prevents cavitation or erosion to the seal faces 24, 32 as high-velocity jets or cavitations can collapse before reaching the seal faces 24, 32. In a non-limiting example of operation, a determination of the flow area FA that is above a threshold magnitude to avoid erosion or cavitation in seal faces 24, 32 is dependent on the flowing fluid FF, such as its characteristics, properties, and constituents, and conditions of the flowing fluid FF, such as its temperature, pressure, and expected pressure differential of the flowing fluid FF through the valve assembly 10. It is believed it is within the capabilities of one skilled in the art to determine values of a threshold flow area FA and threshold distance between opposing sealing faces 24, 32 at which cavitation or erosion of components in the valve assembly 10 does not occur. Example resources for determining these values include API Spec 19G2 and Crane Technical Paper No. 410, both of which are incorporated by reference herein in their entireties and for all purposes.

Figure 3A:
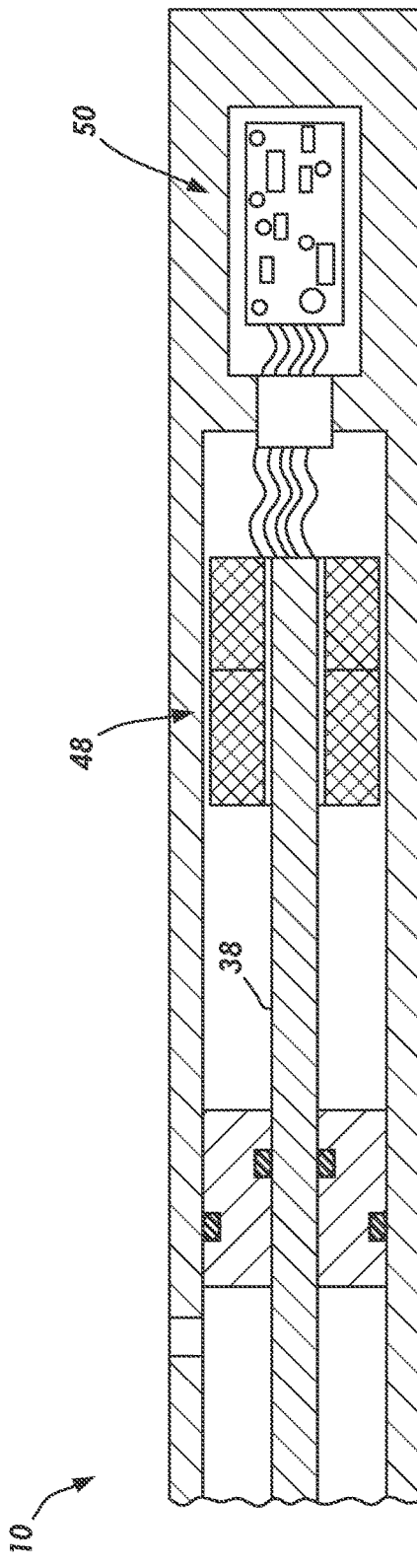
FIG. 3A is a schematic example of a processor and actuator coupled with the valve assembly of FIG. 1.

In the example shown in FIG. 3A, valve assembly 10 is coupled with an actuator 48, which provides an actuating force for moving onto valve stem 38. Included in FIG. 3A is a processor 50 disposed within a portion of housing 12 spaced away from valve assembly 10. Processor 50 is in communication with actuator 48 and selectively provides command signals for controlling operation of actuator 48 and opening and closing of valve assembly 10. In embodiments, the processor 50 is part of an information handling system, and further includes memory accessible by the processor, nonvolatile storage area accessible by the processor, and logics for performing each of the steps described herein.

Figure 3B:
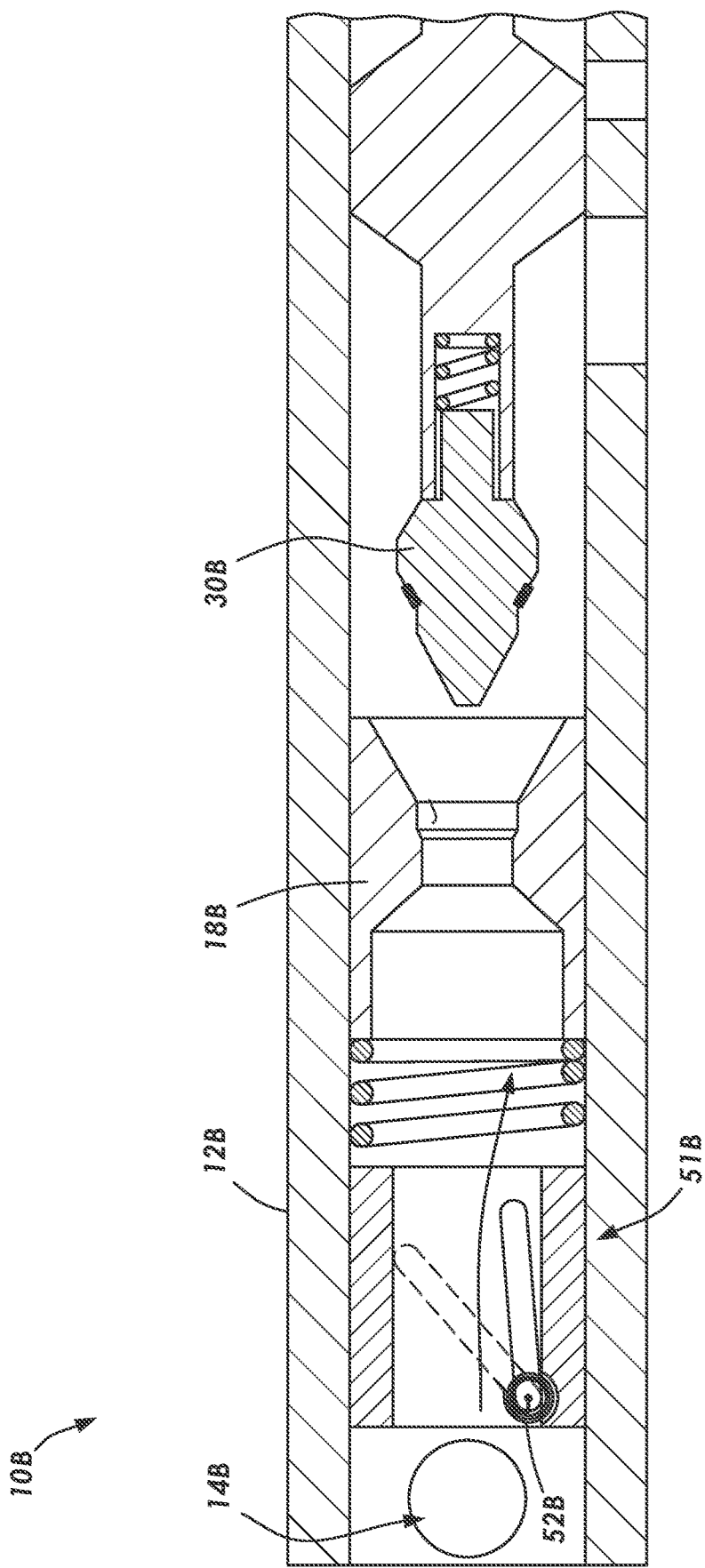
FIG. 3B is an alternate embodiment of the valve assembly of FIG. 2 that includes a check valve.

An alternative example of a valve assembly 10B is shown in a side sectional view in FIG. 3B, and having a check valve 51B with a spring 52B inside housing 12B on a side of seat member 18B opposite plug 30B. In this example, check valve 51B is between side port 14B and seat member 18B. In a non-limiting example of use of valve assembly 10B, check valve 51B limits flow between ports 14B, 16B to a forward direction, and spring 52B biases valve 51B to a closed position (shown in dashed outline) when flow is in a rearward direction to prevent dual flow through the valve assembly 10B.

Shown in a side partial sectional view in FIG. 4 is an example of valve 10 included in a gas lift system 53 being used for lifting liquid L from a well 54. Well 54 is shown intersecting a subterranean formation 56 and having perforations 58 that extend radially outward from the well 54 into the formation 56. Perforations 58 also intersect casing 59 that lines the well 54. Production tubing 60 is inserted within the casing 59. Fluid $F_{58}$ within formation 56 flows from the formation 56 through perforations 58 into the well 54, shown within a bottom of well 54 are liquid L and gas G components of fluid $F_{58}$. Pressure inside formation 56 forces fluid $F_{58}$ from the bottom of the well 54 upward into the production tubing 60. A packer 61 spans between the tubing 60 and casing 59 to force fluid $F_{58}$ into production tubing 60. An upper end of production tubing 60 connects to a wellhead assembly 62 shown on surface 63. Included with gas lift system 53 is a lift gas source 64 shown containing an amount of lift gas 66. Examples of a lift gas source 64 include adjacent wells, a gas line manifold, in-situ gas from well 54, compressors, and other known or future developed sources of gas for use in a lift gas application. A line 68 attaches to a discharge of the lift gas source 64 and provides a conduit for transporting the lift gas 66 into an annulus 70 that is defined in a space between the production tubing 60 and casing 59. In a non-limiting example, valve 10 is configured so that environment $E_{14}$ (FIG. 3) is within, a part of, or in communication with annulus 70, and environment $E_{16}$ (FIG. 3) is within or is in communication with tubing 60; alternatively, valve 10 is configured so that environment $E_{16}$ is within, a part of, or in communication with annulus 70, and environment $E_{14}$ (FIG. 3) is within or is in communication with tubing 60.

Also included with the gas lift system 53 are a series of pressure operated valves 72 that are shown mounted to an exterior of the production tubing 60 at different depths within the well 54. In an example, valves 72 include pressure production valves, injection pressure valves, and optionally are inside production tubing 60. Valves 72 attach respectively to outlet ports 74 that extend through the sidewall of the production tubing 60 and in examples are automatically changeable between the open and closed configurations in response to pressure within the production tubing 60 or annulus 70. Illustrated in FIG. 4 is an example of injecting lift gas 66 from lift gas source 64 into production tubing 60 via valves 72 or valve 10. Lift gas bubbles 76 are shown inside liquid L in production tubing 60 that reduce a density of liquid L for promoting the upward flow of liquid L to the wellhead assembly 62. As shown, valve 10 connects to a controller 82 via a communication circuit 84 that carries signals between the controller 82 and valve 10, examples of the circuit 84 include electrically conductive members, fiber optics, and wireless telemetry. Included in this example are sensors 86, 88 in communication with the production tubing 60 and sensor 90 in communication with a production line 92. Sensors 86, 88, optionally sense conditions inside the tubing 60 or production line 92, where example conditions include pressure, temperature, fluid properties, fluid composition and the like. In the example shown, fluid exiting wellhead assembly 62 and into production line 92 is referred to as production fluid PF, which includes liquid L, gas G, and optionally some amounts of lift gas 66. Production line 92 carries production fluid PF to a terminal location 94. In alternatives, terminal location 94 include one or more of a distribution center where production fluids from other wells are collected combined into a transmission line, a location where the production fluid PF is containerized for delivery elsewhere, or a processing facility where the production fluid PF is refined or conditioned.

Illustrated in a side sectional view in FIG. 5 is an alternative example of a lift gas system 53A in which fluid produced from well 54 $F_{58}$ is forced upwards within annulus 70. In this example lift gas 66 is directed into the production tubing 60 through line 68A. Lift gas 66 exits production tubing 60 through valve 10, through one or more of valves 72, or through both. In this example lift gas bubbles 76 form in the liquid L shown in annulus 70 between tubing 60 and casing 59; lift gas bubbles 76, gas G, and liquid L form at least a part of produced fluid PF shown being carried in production line 92A to terminal location 94.

Referring back to FIG. 3B, in examples in which port 16B is in communication with annulus 70 (FIG. 4) and valve assembly 10B is in an open configuration, fluid injection from annulus 70 to tubing 60 (FIG. 4) is selectively permitted through valve assembly 10B. As noted above, the biasing of spring 52B to close check valve 51B blocks reverse flow from tubing 60 to annulus 70, which prevents high pressure that may be present in the tubing 60 from communicating into the annulus 70.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, this can be used in circulation valves or for general flow such as water injection, production, oil injection, gas production, and the like. These and other similar modifications will readily suggest themselves to those skilled in the art and are intended to be encompassed within the spirit of the present invention disclosed herein and the scope of the appended claims.

What is claimed is:

1. A valve for controlling a flow of fluid comprising:
    a body having a sidewall;
    a chamber in the body;
    valve elements disposed in the chamber that are selectively moveable with respect to one another;
    sealing surfaces on the valve elements;
    a barrier to fluid communication between the valve elements that is selectively formed by bringing the sealing surfaces on the valve elements into sealing contact;
    a resilient member in biasing contact with an end of one of the adjacent valve elements distal from the barrier, so that sealing contact between the sealing surfaces is compliant;
    a choke member selectively moveable between an interfering position and a fluid flow position, the interfering position being between the chamber and one side port to define a substantial barrier to fluid flow through the side port, the fluid flow position being spaced away from a periphery of the side port so that at least a portion of the side port is exposed to the chamber, wherein when the choke member is moved into the fluid flow positon when the sealing surfaces are positioned a threshold distance from one another so that a velocity of fluid flowing between the sealing surfaces is below a minimum velocity that causes erosion of the valve elements the choke member is coupled to a one of the valve elements and at a distance from the sealing surface on the one of the valve elements that is strategically dimensioned so that the choke member is moved into the fluid flow position after the valve elements become spaced apart from one another a distance greater than the threshold distance.

* * * * *

UNITED STATES PATENT AND TRADEMARK OFFICE
CERTIFICATE OF CORRECTION

PATENT NO. : 12,078,040 B2
APPLICATION NO. : 18/355051
DATED : September 3, 2024
INVENTOR(S) : Shaw et al.

Page 1 of 1

It is certified that error appears in the above-identified patent and that said Letters Patent is hereby corrected as shown below:

In the Claim

Column 10, Claim 1, Line 9:
"positon"
Should be changed to:
--position--.

Signed and Sealed this
Twenty-fourth Day of December, 2024

Derrick Brent
*Acting Director of the United States Patent and Trademark Office*